US012722137B2

(12) United States Patent
Ivashko et al.

(10) Patent No.: US 12,722,137 B2
(45) Date of Patent: Sep. 1, 2026

(54) HIGH SOLIDS CONCENTRATION SYNTHESIS OF METAL-ORGANIC FRAMEWORKS

(71) Applicant: EXXONMOBIL TECHNOLOGY AND ENGINEERING COMPANY, Annandale, NJ (US)

(72) Inventors: Anna C. Ivashko, Denville, NJ (US); Aaron W. Peters, New Hope, PA (US); Preeti Kamakoti, Berkeley Heights, NJ (US); Scott J. Weigel, Allentown, PA (US); Matthew T. Kapelewski, Flemington, NJ (US); Nicole M. Herb, Allentown, PA (US); Roxana Perez Velez, Leuven (BE); Marc H. Anthonis, Hofstade (BE); Doron Levin, Highland Park, NJ (US); Tara L. Reddington, Easton, PA (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 901 days.

(21) Appl. No.: 17/855,980

(22) Filed: Jul. 1, 2022

(65) Prior Publication Data

US 2024/0001335 A1 Jan. 4, 2024

(51) Int. Cl.
*B01J 20/22* (2006.01)
*B01J 20/28* (2006.01)
(Continued)

(52) U.S. Cl.
CPC ....... *B01J 20/226* (2013.01); *B01J 20/28064* (2013.01); *B01J 20/28073* (2013.01);
(Continued)

(58) Field of Classification Search
None
See application file for complete search history.

(56) References Cited

U.S. PATENT DOCUMENTS 7,411,081 B2 8/2008 Mueller et al.
9,861,953 B2 1/2018 Long et al.
(Continued)

FOREIGN PATENT DOCUMENTS

WO WO-2020068996 A1 * 4/2020 .......... C07F 15/0066
WO 2020-219907 A 10/2020

OTHER PUBLICATIONS

Davison et al., "The metabolism of 5,5'-methylenedisalicylic acid in various species." J. Pharm. Pharmac., 1968, vol. 20, pp. 12-18.*
(Continued)

*Primary Examiner* — Daniel Berns
(74) *Attorney, Agent, or Firm* — Shook, Hardy & Bacon L.L.P.

(57) ABSTRACT

Methods are provided for synthesizing metal-organic framework compositions using synthesis mixtures with elevated solids content and/or elevated kinematic viscosity. The methods can allow for formation of MOF-274 metal-organic framework compositions, such as EMM-67 (a mixed-metal MOF-274 metal-organic composition). More generally, the methods can allow for formation of MOF structures that include multi-ring disalicylate organic linkers using synthesis mixtures that contain a reduced or minimized amount of solvent, such as down to having substantially no solvent in the synthesis mixture.

12 Claims, 4 Drawing Sheets

(51) Int. Cl.
*B01J 20/30* (2006.01)
*C07F 3/02* (2006.01)

(52) U.S. Cl.
CPC ..... *B01J 20/28076* (2013.01); *B01J 20/3085* (2013.01); *C07F 3/02* (2013.01)

(56) References Cited

U.S. PATENT DOCUMENTS

| | | | |
|---|---|---|---|
| 10,737,239 | B2 | 8/2020 | Burckhart et al. |
| 2021/0053903 | A1 | 2/2021 | Abney et al. |

OTHER PUBLICATIONS

Long, J.R., et al., "Controlling Cooperative CO2 Adsorption in Diamine-Appended Mg2(dobpdc) Metal-Organic Frameworks", J. Am. Chem. Soc., vol. 139, pp. 10526-10538, 2017.

Milner, P.J., et al., "A Diaminopropane-Appended Metal-Organic Framework Enabling Efficient CO2 Capture from Coal Flue Gas via a Mixed Adsorption Mechanism", J. Am. Chem. Soc., vol. 139, pp. 13541-13553, 2017.

McDonald, T.M., et al., "Capture of Carbon Dioxide from Air and Flue Gas in the Alkylamine-Appended Metal-Organic Framework mmen-Mg2(dobpdc)", J. Am. Chem. Soc, vol. 134, pp. 7056-7065, 2012.

McDonald, T.M., et al., "Cooperative insertion of CO2 in diamineappended metal-organic frameworks", Nature, vol. 519, pp. 303-308, 2015.

Milner, P.J., et al., "Overcoming double-step CO2 adsorption and minimizing water co-adsorption in bulky diamineappended variants of Mg2(dobpdc)†", Chem Sci, vol. 9, pp. 160,-174, 2018.

Sanchez-Chanzhez, M., et al., "Synthesis of Metal Organic Frameworks in Water at Room Temperature: Salts as Linker Sources", Green Chem., vol. 17, pp. 1500-1509, 2015.

* cited by examiner

HIGH SOLIDS CONCENTRATION SYNTHESIS OF METAL-ORGANIC FRAMEWORKS

FIELD

Methods are provided for synthesizing metal-organic framework materials using synthesis mixtures with high contents of solids. Corresponding metal-organic framework materials are also provided.

BACKGROUND

Traditional synthesis methods for making metal-organic frameworks (MOFs) involve complete dissolution of solids in organic solvents forming a reaction solution that then enhances metal-organic framework formation at elevated temperatures. Often the prerequisite of such synthesis is a large volume of solvent required for reagent dissolution. For crystal growth, however, the amount of the solid reagents needed to make the metal-organic framework is often the limiting factor.

Traditional synthetic protocols can have several major drawbacks, including long reaction time and low yield. While yields obtained using traditional solvothermal methods are reasonable for laboratory use, the methods are inefficient on an industrial scale in terms of time, separation of solvents, and heating. Optimization and scale-up of metal-organic framework syntheses are particularly challenging due to the nature of the materials, as they often require large amounts of solvents and can accommodate small amounts of solids. This naturally results in poor yields of materials and extremely intensive processes in order to produce enough material for testing. Additionally, the organic solvents required for such traditional synthesis protocols are also less desirable, as such solvents can require increased or specialized care to handle safely.

A need exists, therefore, for synthesis of metal-organic frameworks that produce higher yields of metal-organic materials with reduced labor than that typically required to obtain high quality metal-organic frameworks. Preferably, the improved synthesis methods can reduce or minimize the need to use solvents during the synthesis process.

U.S. Pat. No. 9,861,953, describes a metal-organic framework, MOF-274. This framework can be synthesized from individual metal precursors, but not a mixed-metal-organic framework. Other types of metal-organic frameworks are described in J. Am. Chem. Soc, 2012, 134, 7056-7065, Nature, 2015, 519, 303-308, J. Am. Chem. Soc, 2017, 139, 10526-10538, J. Am. Chem. Soc. 2017, 139, 13541-13553, and Chem Sci, 2018, 9, 160.

In an article titled "Synthesis of Metal-organic Frameworks in Water at Room Temperature: Salts as Linker Sources", a water based synthesis is described for making MOF-74, a metal-organic framework structure based on a linker that includes a single aromatic ring.

International Publication No. WO/2020/219907 describes mixed-metal mixed-organic framework systems for selective $CO_2$ capture.

U.S. Patent Application Publication 2021/0053903 describes methods for selecting solvents for synthesis of metal-organic framework compositions based on Hansen solubility parameters.

U.S. Pat. No. 7,411,081 describes a process for preparing an organometallic framework material. The process includes reacting at least one metal salt with a ligand in an aqueous solvent system in the presence of at least one base.

U.S. Pat. No. 10,737,239 describes a process for preparing an organometallic framework material. The process includes mixing a dry composition of metal reagent and a bidentate organic compound. A solvent is then added and the mixture is mixed to form the MOF material. The amount of solvent corresponds to an amount so that the solvent is taken up into the pores of the MOF material that is subsequently formed.

SUMMARY

In an aspect, a method of making a metal-organic framework composition is provided. The method includes forming a mixture containing one or more metal compounds, a solvent, and at least one multi-ring disalicylate linker, the mixture having a solids content of 35 wt % or more, a kinematic viscosity at 40° C. of 500 cSt or more, or a combination thereof. Additionally, the method includes reacting the mixture for a reaction time to form a composition including a metal-organic framework, wherein the metal-organic framework includes at least one metal of the one or more metal compounds and the at least one multi-ring disalicylate organic linker. In some aspects, at least a portion of the solvent can be added to the mixture prior to mixing of the mixture. Additionally or alternately, the solvent can be added to the mixture prior to addition of at least a portion of the one or more metal compounds. Further additionally or alternately, the solvent can be added to the mixture prior to addition of at least a portion of the at least one multi-ring disalicylate linker. Optionally, the one or more solvents can include 40 wt % or more of water.

In another aspects, a method of making a metal-organic framework composition is provided. The method includes forming a mixture containing one or more metal compounds and at least one multi-ring disalicylate linker, the mixture being substantially free of solvent. Additionally, the method includes reacting the mixture for a reaction time to form a composition including a metal-organic framework, wherein the metal-organic framework includes at least one metal of the one or more metal compounds and the at least one multi-ring disalicylate organic linker.

In still another aspect, a crystalline metal-organic framework composition formed from a high solids synthesis mixture is provided. The composition includes a multi-ring disalicylate linker and one or more metallic elements that form a crystalline structure corresponding to the metallic elements bridged by the multi-ring disalicylate linker. The crystalline metal-organic framework composition comprising crystals can have an average aspect ratio of 8.0 to 1 or less. The composition optionally further includes one or more amines appended to the crystalline metal-organic framework.

DETAILED DESCRIPTION

Overview

Figure 1:
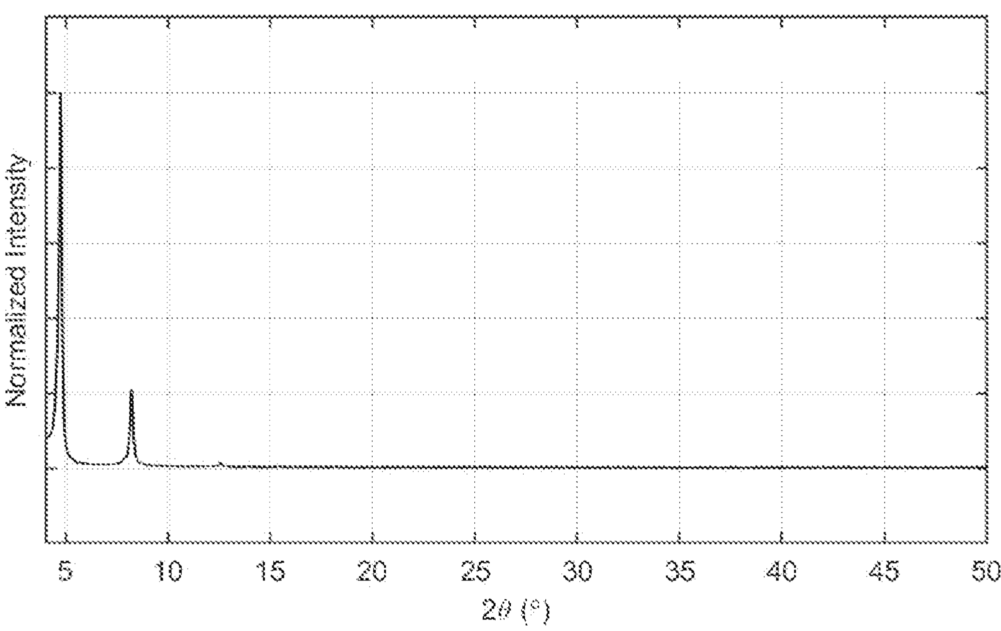
FIG. 1 shows powder x-ray diffraction data of a sample of EMM-67 prepared from a synthesis mixture including a high solids content of metal oxides.

In various aspects, methods are provided for synthesizing metal-organic framework compositions using synthesis mixtures with elevated solids content and/or elevated kinematic viscosity. The methods can allow for formation of MOF-274 metal-organic framework compositions, such as EMM-67 (a mixed-metal MOF-274 metal-organic composition). More generally, the methods can allow for formation of MOF structures that include multi-ring disalicylate organic linkers using synthesis mixtures that contain a reduced or minimized amount of solvent, such as down to having substantially no solvent in the synthesis mixture. Optionally, the reduced or minimized amount of solvent can include 40 wt % or more of water relative to the weight of the solvent. Using a synthesis mixture with a reduced or minimized amount of solvent can provide a variety of advantages. The advantages can include, but are not limited to, increasing the density of synthesis reagents in the synthesis mixture, and simplifying scale-up of the synthesis to larger batch sizes, due in part to the reduction or minimization of solvent. Additionally, the crystals formed from the high solids synthesis mixture can have a reduced aspect ratio relative to crystals formed from a conventional synthesis mixture.

In some aspects, the synthesis mixture can include an unexpectedly high content of solids. In such aspects, the solid reagents (metal compounds, linkers, bases) added to the synthesis mixture can correspond to 35 wt % or more of the weight of the mixture, or 45 wt % or more, or 55 wt % or more, or 65 wt % or more, or 75 wt % or more, such as up to 100 wt % of the mixture (i.e., a synthesis mixture with substantially no added solvent). It is noted that in aspects where the solids content of the synthesis mixture approaches 100 wt %, mixing can be used prior to and/or during the synthesis reaction to allow the reagents to combine to form the metal-organic framework composition as a reaction product. Conventionally, it is expected that a solvent environment is necessary in order to allow the reagents to come together for reaction. However, when using synthesis mixtures that include little or no solvent, it has been found that metal-organic framework compositions can be formed with sufficient mixing of solid reagents, either prior to and/or during the reaction time for forming the metal-organic framework.

Additionally or alternately, in some aspects the synthesis mixture can have an unexpectedly high kinematic viscosity. In such aspects, the kinematic viscosity at 40° C. (KV40) of the synthesis mixture can be 500 cSt or higher, such as up to 100,000 cSt or possibly still higher. Conventionally, it is expected that such kinematic viscosities would prevent sufficient interaction of reagents. However, it has been discovered that such high viscosity synthesis mixtures can be used, with sufficient mixing either prior to or during the reaction, to form metal-organic framework compositions. It is noted that specifying a kinematic viscosity implicitly requires the presence of a liquid phase, and therefore a synthesis mixture where a kinematic viscosity can be measured typically corresponds to a synthesis mixture that includes a solvent.

When a solvent is included in the synthesis mixture, an alternative method for identifying a high solids content and/or a high kinematic viscosity can be based on the concentration of metal compounds and ligands in the synthesis mixture. In some aspects, a high solids and/or high kinematic viscosity synthesis mixture can have a combined concentration of metals plus linkers of 2.1 moles or more per liter of solvent (i.e., a molarity of 2.1 M or more), 2.5 M or more, or 3.0 M or more, or 3.5 M or more, such as up to 15 M or possibly still higher. For example, if a synthesis mixture includes water as a solvent and further includes 2.0 moles per liter (2.0 M) of Mg and 1.5 moles per liter (1.5 M) of linker, the combined concentration would be 3.5 M. Additionally or alternately, the concentration of metals in the synthesis mixture can be 1.5 M or more (i.e., 1.5 moles of metal or more per liter of solvent), or 2.0 M or more, or 2.5 M or more, such as up to 15 M or possibly still higher. Further additionally or alternately, the concentration of linkers in the synthesis mixture can be 0.6 M or more, or 1.0 M or more, or 1.5 M or more, such as up to 10 M or possibly still higher. It is noted that for molarity values above 15 M, the amount of solids is high enough that it is generally more appropriate to specify a weight, volume, and/or mole percentage of solids in the synthesis mixture, as opposed to expressing a molar quantity of solids per liter of solvent.

In some aspects, instead of using a base or buffer, the synthesis mixture can include at least one multi-ring disalicylate linker; one or more metal reagents selected from metal oxides, metal hydroxides, metal carbonates, and/or metal acetates; and optionally a solvent. In such aspects, the synthesis mixture can include solvent, linker(s), and metal reagent(s) without the presence of an additional base or buffer.

In this discussion, a synthesis mixture that consists essentially of (optional) solvent, linker(s), and metal reagent(s) is defined as a synthesis mixture that does not include a separately added base or buffer. Other components can be added to the synthesis mixture, so long as such other components do not have a substantial impact on the pH of the synthesis mixture. In this discussion, a substantial impact on the pH of the synthesis mixture can be determined by comparison of the pH of the synthesis mixture with the pH of a mixture containing only the solvent, linker(s), and metal reagent(s) in the same molar ratio as the synthesis mixture. For a mixture that contains no solvent or minimal solvent making it impossible to measure the pH, the appropriate molar ratios of the linker(s) and metal reagent(s) provide the appropriate composition for forming the target MOF. A substantial impact in pH is defined as the pH of the synthesis mixture being different from the pH of a comparative mixture containing only the optional solvent, linker(s), and metal reagent(s) in the same molar ratio by 0.5 or less, or 0.2 or less, such as down to having substantially no difference in pH between the synthesis mixture and the comparative mixture. If the pH of the synthesis mixture is different from the pH of the comparative mixture by 0.5 or less, or 0.2 or less, then the synthesis mixture is defined as having substantially the same pH as the comparative mixture. As an example, if the pH of the synthesis mixture is 8.0, then any additional components in the synthesis mixture would not have a substantial impact on the pH (i.e., the pH would be substantially the same) if a comparative mixture containing only the optional solvent, linker(s), and metal reagent(s) in the same ratio has a pH between 7.5 and 8.5, or 7.8 and 8.2.

The metal-organic framework compositions formed using a high solids synthesis mixture and/or a high kinematic viscosity synthesis mixture can have substantially the same structural features and properties and/or improved features and properties relative to corresponding compositions synthesized using a conventional organic solvent environment, such as metal-organic framework compositions synthesized in a solvent environment corresponding to a mixture of methanol and N,N-dimethylformamide. After formation of the metal-organic framework composition, further reactions can be performed on the metal-organic framework composition. For example, EMM-67 (an example of a MOF-274 metal-organic framework composition) can be further reacted to append suitable amines to the composition in order to form EMM-44.

Optionally, the synthesis mixture can further include one or more solvents, such as water, alcohol, and/or organic solvents. In some aspects, 40 wt % or more of the solvent (relative to the weight of the solvent) can correspond to water, alcohol, or a combination thereof, or 50 wt % or more, or 60 wt % or more, or 70 wt % or more, such as up to 100 wt %. In this discussion, a solvent including 99.0 vol % or more of water is defined as a solvent that consists essentially of water. Examples of suitable alcohols include ethanol and isopropyl alcohol, although methanol and the isomers of propanol and n-butanol can also be suitable. Some examples of organic solvents can include other oxygenated solvents such as tetrahydrofuran. More generally, any convenient type of organic solvent used for low-solids content synthesis of a metal-organic framework can be used. The amount of solvent in the synthesis mixture can be low enough so that the synthesis is mixture corresponds to a high-solids synthesis mixture and/or so that the synthesis mixture has an elevated kinematic viscosity. In some aspects, the solvent content can be less than 50 wt % of the weight of the synthesis mixture, or 40 wt % or less, or 30 wt % or less, or 20 wt % or less, such as down to having substantially no solvent. It is noted that some solid reagents can include waters of hydration. A synthesis mixture where the only "solvent" present in the mixture corresponds to waters of hydration in one or more solid reagents is defined herein as a synthesis mixture that contains substantially no solvent.

In some aspects, bases such as sodium hydroxide (and/or other alkali hydroxides) can be added to a synthesis mixture to control the pH of the synthesis mixture. Additionally or alternately, metal reagents can be used that correspond to metal oxides, metal hydroxides, metal carbonates, and/or metal acetates in order to control the pH of the synthesis mixture, so that a separate base or buffer is not required to be added to the synthesis mixture. Further additionally or alternately, in some aspects a buffer can be added to allow for control of the pH of the synthesis mixture.

In some aspects, the metal-organic framework compositions can have a surface area, as determined by nitrogen adsorption (ASTM D3663, BET surface area) of 700 $m^2/g$ or more, or 900 $m^2/g$ or more, or 1500 $m^2/g$ or more, such as up to 4000 $m^2/g$ or possibly still higher. Additionally or alternately, the metal-organic framework compositions can have a pore volume, as determined by nitrogen adsorption (ASTM D4641) of 0.6 $cm^3/g$ to 1.6 $cm^3/g$.

Optionally, the metal-organic framework compositions can include one or more impurities, such as unreacted metal compounds that become incorporated into the solid product. Such impurity compounds can include, but are not limited to, metal compound(s) used as a reagent for forming a metal-organic framework; unreacted reagent ligand, decomposition products of the reagent ligand, and salts formed from a) the metal ion used for introducing a base into the synthesis mixture and b) the counter-ions from the metal compounds. Examples of metal compounds can include carbonates (such as $MgCO_3$), oxides (such as MgO), hydroxides (such as $Mg(OH)_2$), nitrates (such as $Mg(NO_3)_2$), and chlorides (such as $MnCl_2$). An example of a salt formed in the synthesis mixture can be $NaNO_3$, where the $Na^+$ ion is initially introduced as part of a base (such as NaOH) and the $NO_3^-$ ion is introduced as the counter-ion in a metal compound (such as $Mg(NO_3)_2$).

Definitions

All numerical values within the detailed description and the claims herein are modified by "about" or "approximately" the indicated value, and take into account experimental error and is variations that would be expected by a person having ordinary skill in the art.

It is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the purposes of this disclosure, the following definitions will apply:

As used herein, the terms "a" and "the" as used herein are understood to encompass the plural as well as the singular.

As used herein, the term "heteroatom" includes oxygen (O), nitrogen (N), sulfur (S) and silicon (Si), boron (B) and phosphorous (P).

The term "multi-ring" is defined herein to refer to compounds that include two or more ring structures. The rings can correspond to fused rings, such as a naphthalene-type structure, rings bonded together without sharing an atom, such as a biphenyl linkage, or rings separated by one or more atoms, such as rings separated by a methyl linkage. This is in contrast to a single-ring compound. A multi-ring compound can include multiple aromatic rings, multiple non-aromatic rings (such as saturated rings and/or rings including an insufficient number of double bonds to provide aromaticity), or a combination thereof.

The term "aryl" means, unless otherwise stated, a polyunsaturated, aromatic substituent that can be a single ring or multiple rings fused together or linked covalently. In an aspect, the substituent has from 1 to 11 rings, or more specifically, 1 to 3 rings. The term "heteroaryl" refers to aryl substituent groups (or rings) that contain from one to four heteroatoms selected from N, O and S, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

As used herein, the terms "alkyl," "aryl," and "heteroaryl" can optionally include both is substituted and unsubstituted forms of the indicated species. Substituents for the aryl and heteroaryl groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO.sub.2R', —CONR'R", —OC(O)NR'R", —NR"C(O)R', —NR'—C(O)NR"R'", —NR"C(O).sub.2R', —NR—C(NR'R"R'").dbd.NR"", —NR—C(NR'R")=NR'", —S(O)R', —S(O)R', —S(O)NR'R", —NRSOR', —CN and, —R', —, —CH(Ph), fluoro($C_1$-$C_4$)alkoxy, and fluoro($C_1$-$C_4$)alkyl, in a number ranging from zero to the total number of open valences on the aromatic ring system. Each of the above-named groups is attached to the aryl or heteroaryl nucleus directly or through a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl."

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom is selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, $—CH_2—CH_2—O—CH_3$, $—CH_2—CH_2—NH—CH_3$, $—CH_2—CH_2—N(CH_3)—CH_3$, $—CH_2—S—CH_2—CH_3$, $—CH_2—CH_2$, $—S(O)—CH_3$, $—CH_2—CH_2—S(O)_2—CH_3$, $—CH=CH—O—CH_3$, $—Si(CH_3)_3$, $—CH_2—CH=N—OCH_3$, and $—CH=CH—N(CH_3)—CH_3$. Up to two heteroatoms may be consecutive, such as, for example, $—CH_2—NH—OCH_3$ and $—CH_2—O—Si(CH_3)_3$. Similarly, the term "heteroalkylene" by itself or as part of another substituent means a divalent radical derived from heteroalkyl, as exemplified, but not limited by, $—CH_2—CH_2—S—CH_2—CH_2—$ and $—CH_2—S—CH_2—CH_2—NH—CH_2—$. For heteroalkylene groups, heteroatoms can also occupy either or both chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula $—CO_2R'—$ represents both —C(O)OR' and —OC(O)R'.

As used herein, the term "ligand" means a molecule containing one or more substituent groups capable of functioning as a Lewis base (electron donor). In an aspect, the ligand can be oxygen-, phosphorus- or sulfur-containing molecules. In an aspect, the ligand can be an amine or amines containing 1 to 10 amine groups.

The terms "halo" or "halogen," by themselves or as part of another substituent, mean, unless otherwise stated, a fluorine, chlorine, bromine, or iodine atom.

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

As used herein, the term "Periodic Table" means the Periodic Table of the Elements of the International Union of Pure and Applied Chemistry (IUPAC), dated December 2015.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present disclosure contain both basic and acidic functionalities that allow the compounds to be converted into either base or acid addition salts. Hydrates of the salts are also included.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition, it is understood that, in any compound described herein having one or more double bond(s) generating geometrical isomers that can be defined as E or Z, each double bond may independently be E or Z or a mixture thereof. Likewise, it is understood that, in any compound described, all tautomeric forms are also intended to be included.

In addition, the compounds provided herein may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$) or carbon-14 ($^{14}C$). All isotopic variations of the subject compounds, whether radioactive or not, are intended to be encompassed within the scope of present disclosure.

In some optional aspects, deoxygenated water can be used. Deoxygenated water corresponds to water with an oxygen content of 0.1 wppm or less, or 0.01 wppm or less. The water can be deoxygenated by any convenient method, such as sparging the water by passing nitrogen gas through the water in substantially oxygen-free atmosphere (such as under a nitrogen blanket). More generally, sparging and/or other deoxygenation techniques can be used to deoxygenate mixtures of water and an organic solvent.

In this discussion, some metal organic frameworks may be described using a stoichiometric formula, such as describing a metal organic framework as having a formula of "$M^1_xM^2_{(2-x)}(A)$ where $M^1$ and $M^2$ comprise metal cations, x ranges from 0 to 2, and A comprises a multi-ring disalicylate organic linker". Such a stoichiometric formula corresponds to the idealized composition. However, to the degree that defects may be present in a crystal structure, the actual stoichiometry can vary from the idealized stoichiometry. Such defects can correspond to, for example, locations where an alternative cation is present at the defect site. In this discussion, when a metal organic framework composition is described as being "substantially of a formula," it is understood that such a formula accounts for potential defect sites that may occur. Thus, the sum of "x" and "2−x" may differ from being exactly 2.0, and instead may be, for example, 1.99 or 2.01 due to the absence and/or presence of metals at defect sites.

Traditional Synthesis

Traditionally, metal-organic frameworks are prepared by reactions of pre-synthesized or commercially available linkers with metal ions. An alternative approach, referred to as "in situ linker synthesis," specified organic linkers (linkers) can be generated in the reaction media in situ from the starting materials.

In synthesizing the metal-organic framework, elevated reaction temperatures are generally employed in conventional synthesis to facilitate incorporation of the organic linker molecules into the metal-organic framework compound. Solvothermal reaction conditions as well as microwave-assisted synthesis or steam-assisted conversions have also been recently introduced.

As referred to herein, the traditional synthesis is typically reactions carried out by conventional electric heating without any parallel reactions. In the traditional synthesis, reaction temperature is one of the primary parameters of a synthesis of the metal-organic framework and two temperature ranges, solvothermal (including hydrothermal, when the solvent is substantially based on water) and nonsolvothermal, are normally distinguished. Selection of solvothermal versus nonsolvothermal conditions can determine the kind of reaction setups to be used. Solvothermal reactions (including hydrothermal reactions, when the solvent is substantially based on water) generally take place in closed vessels under autogenous pressure about the boiling point of the solvent used. Non-solvothermal reactions take place below, or at the boiling point under ambient pressure, simplifying synthetic requirements. Non-solvothermal reactions can be further classified as room-temperature or elevated temperatures.

Traditional synthesis of metal-organic frameworks takes place in an organic solvent environment and at temperatures ranging from room temperature to approximately 250° C. Heat is transferred from a hot source, the oven, through convection. Alternatively, energy can be introduced through an electric potential, electromagnetic radiation, mechanical waves (ultrasound), or mechanically. The energy source is closely related to the duration, pressure, and energy per molecule that is introduced into a system, and each of these parameters can have a strong influence on the metal-organic framework formed and its morphology.

Traditional synthesis of metal-organic frameworks is described in McDonald, T., Mason, J., Kong, X. et al, Cooperative insertion of $CO_2$ in diamine-appended metal-organic frameworks, Nature 519, 303-08 (2015), which is incorporated herein by reference. Generally, 0.10 mmol of a linker, 0.25 mmol of metal salts, and 10 mL of a solvent, i.e., methanol/dimethylformamide (DMF) are combined together in a 20 mL glass scintillation vial. The vial is then sealed and placed in a well plate two (2) cm deep on a 120° C. hot plate for about 12 hours, after which a powder forms on the bottom and walls of the vial. The metal-organic framework material is then decanted and the remaining powder soaked three times in DMF and then three times in methanol. The metal-organic framework is then collected by filtration and fully desolvated by heating under dynamic vacuum (<10 μbar) at 250° C. for 24 hours. Using this specific methodology, the traditional synthesis method yields about 0.073 mmol of metal-organic frameworks, or 73% yield (comparing mmol of the metal-organic frameworks produced to initial mmol of linker) or a volume-normalized mass-based yield of 2.7 grams MOF per liter of reaction solution.

In addition to the traditional synthesis described in Nature, 2015, 519, 303-308, incorporated herein by reference, synthesis of making metal-organic frameworks are further described in: J. Am. Chem. Soc. 2012, 134, 7056-7065; Chem. Sci, 2018, 9, 160-174; U.S. Pat. No. 8,653,292 and US Patent Appl. Pub. Nos. 2007/0202038, 2010/0307336, and 2016/0031920.

Synthesis of Metal-organic Frameworks in High Solids and/or High Viscosity Environments In various aspects, methods are provided for synthesis of metal-organic framework compositions in a high solids and/or high kinematic viscosity synthesis mixture. The synthesis mixture can include one or more metal compounds, one or more organic linkers, and optionally one or more bases or buffers separate from the one or more metal compounds. It is noted that if one or more metal salts corresponds to a metal oxide, metal hydroxide, metal carbonate, and/or a metal acetate, a base may not be needed. Optionally, a solvent can also be present. The synthesis mixture can be exposed to a reaction temperature for a reaction time to allow for formation of the metal-organic framework composition. In some aspects, the reaction temperature can be a temperature greater than ambient. Optionally, mixing can be performed prior to the reaction time and/or during at least a portion of the reaction time.

Generally, the organic linker can correspond to a multi-ring linker. In some aspects, the organic linker includes multiple bridged aryl species such as molecules having two or more phenyl rings or two phenyl rings joined by a biphenyl, vinyl, or alkynyl group. For example, an organic linker can correspond to a disalicylate. In some aspects, a plurality of rings in the multi-ring is disalicylate organic linker can include a salicylate functional group.

During synthesis of a metal-organic framework composition, the one or more metal compounds and the one or more organic linkers (such as disalicylate linkers) can be combined to form a mixture. Any optional base and/or solvent can also be added. The vessel containing the synthesis mixture is then sealed and (optionally) heated by one of various methods for a reaction time. Due to the high solids content and/or high kinematic viscosity of the synthesis mixture, stirring or other mixing can optionally be performed during the reaction time to facilitate contact between the reagents.

In various aspects, the metal compounds can be divalent metal salts. For example, the metal compounds can be a divalent first-row transition metal salt having the formula $MX_2$ such as M=Mg, Mn; $X_2$=$(Oac)_2$, $(HCO_3)_2$, $(F_3CCO_2)_2$, $(acac)_2$, $(F_6acac)_2$, $(NO_3)_2$, $SO_4$; M=Ni, $X_2$=$(Oac)_2$, $(NO_3)_2$, $SO_4$; M=Zn, $X_2$=$(Oac)_2$, $(NO_3)_2$. In an aspect, the metal salts can be in the form of crystals or crystalline powder. In an aspect, the metal salts are $Mg(NO_3)_2 \cdot 6H_2O$ and $MnCl_2 \cdot 4H_2O$ for example. Additionally or alternately, at least a portion of the metal compound can correspond to a metal oxide. In some aspects, one or more metal compounds can correspond to a metal oxide, metal hydroxide, metal carbonate, and/or metal acetate. In an aspect, the resulting metal-organic framework is EMM-67, which is a type of MOF-274.

As described herein, some suitable linkers can be formed by two phenyl rings joined at carbon 1,1' (i.e., a biphenyl type linkage), with carboxylic acids on carbons 3, 3', and alcohols on carbons 4,4'. This linker can be referred to as "$H_4$DOBPDC". In such aspects, switching the position of the carboxylic acid and the alcohol groups (e.g., "pc-$H_4$DOBPDC" or "pc-MOF-274") still allows for formation of a metal-organic framework. In an aspect, the linker is $H_4$DOBPDC By way of nonlimiting example, metal-organic frameworks can be synthesized by mixing one or more metal compounds (metal oxides and/or metal salts) with one or more linkers, optionally in the presence of a separate base and/or a buffer. The metal compound(s), linker(s), and optional additional base can be added in a target molar ratio. In various aspects, the ratio of linker(s) to metals in the metal compound(s) in the synthesis mixture can be 0.20 to 0.60, or 0.25 to 0.60, or 0.30 to 0.60, or 0.20 to 0.55, or 0.25 to 0.55, or 0.30 to 0.55, or 0.20 to 0.50, or 0.25 to 0.50. Additionally or alternately, the ratio of base to linker(s) in the synthesis mixture can be 2.5 to 5.0, or 3.5 to 4.5. Alternatively, a buffer can be added in addition to or instead of a base. In aspects where a buffer is used in place of a base, a molar ratio of buffer components to linker(s) in the synthesis mixture can be 8.0 to 12, or 5.0 to 15. When determining the molar ratio of buffer to base, the combined molar quantity of acid plus conjugate base in the buffer is compared with the moles of linker(s).

It is noted that the metals in the metal compounds refers to metals from the metal compounds for incorporation into the metal-organic framework composition. Metals added as part of a separate base (such as Na from NaOH) are not included, as metals such as Na are not incorporated in a stoichiometric manner into the metal-organic framework composition. However, metals from metal compounds such as MgO, $Mg(OH)_2$, or $Mn(OH)_2$ are included, as such metals correspond to reagents containing metals that are stoichiometrically incorporated into the metal-organic framework composition. It is noted that by definition, metal impurities in an MOF composition correspond to metals that are incorporated in a non-stoichiometric manner.

In aspects where a separate base is added to the synthesis mixture, examples of suitable bases include, but are not limited to, piperazine, 1,4-dimethylpiperazine, pyridine, 2,6-lutidine, sodium hydroxide, potassium hydroxide, lithium hydroxide, various types of amines (primary, secondary, and/or tertiary), ammonium hydroxide and the like, and any combination thereof. Such bases can be added as a solid or a liquid reagent or can be added along with a solvent. In aspects where a buffer is added, the buffer can include an acid and its conjugate base, or a base and its conjugate acid. The buffers can be generated in situ by addition of the buffering acid followed by addition of a basic solution to the appropriate pH. Similarly, the buffers can be generated in situ by addition of the buffering base followed by addition of an acidic solution to the appropriate pH. In an aspect, the buffer can be 3-(N-morpholino)propanesulfonic acid ("MOPS") or Na MOPS. Other examples of suitable acids and conjugate bases, and suitable bases and conjugate acids which are used to buffer the nominal pH include, but are not limited to, acetic acid/acetate, citric acid/citrate, boric acid/borate, and the like, the buffers known as "Good Buffers" defined in *Biochemistry,* 1966, 5, 467-477, incorporated herein by reference, and the noncomplexing tertiary amine buffers known as "Better Buffers" defined in *Anal Chem.,* 1999, 71, 3140-3144, incorporated herein by reference.

Mixing of the synthesis mixture can be used to assist with formation of a metal-organic framework composition. Depending on the aspect, the synthesis mixture can be mixed prior to heating the mixture and/or during heating of the mixture. For example, in some aspects, the reagents can be mixed as they are being combined in a mixing vessel(s) at various mixing/stirring speeds, followed by heating of the synthesis mixture under static conditions to form the metal-organic framework. As another example, in some aspects the components of the synthesis mixture can be combined with little or no mixing prior to heating, followed by mixing while heating the synthesis mixture to form the metal-organic framework. Optionally, the mixing can be performed for a portion of the reaction time/heating time. Optionally, in aspects where sufficient solvent is present for the solid reagents to become dissolved in the solvent, it may be possible to form a metal-organic framework with little or no mixing at any stage, with the exception of any mixing that is needed to form the solution. In aspects where a solvent is used, the metal reagents and/or linker can be added to the solvent prior to mixing of the solid reagents. Examples of suitable mixing vessels include, but are not limited to, blenders, rotary cones, high shear mixing, and stir plates. Various mixing speeds and/or shear amounts can be suitable when mixing is performed. In some aspects, the synthesis mixture can be mixed at ambient temperature. Optionally, the synthesis mixture can be heated during the mixing.

In various aspects, the temperature of the synthesis mixture during the mixing for the reaction time period can be 20° C. to 175° C., or 50° C. to 175° C., or 100° C. to 175° C., or 20° C. to 150° C., or 50° C. to 150° C. The reaction time period (with optional mixing) can be from 1 hour to 7 days, or 6 hours to 5 days, or 12 hours to 3 days. After reaction, the reaction solution can be centrifuged or filtered to obtain the metal-organic frameworks and washed.

In an aspect, the linker comprises multiple bridged aryl species having two or more phenyl rings or two phenyl rings joined by a vinyl group or an alkynyl group. In an aspect, the linker is $H_4$DOBPDC. In an aspect, the metal compounds are metal salts are prepared by neutralization of acids or bases of a metal ion. In an aspect, the metal compounds are $Mg(NO_3)_2 \cdot 6H_2O$ and $MnCl_2 \cdot 4H_2O$. In an aspect, the metal-organic frameworks comprise metal ions of one more distinct elements and a plurality of organic linkers, wherein each organic linker is connected to one of the metal ions of two or more distinct elements. In an aspects, the organic linker(s) correspond to disalicylate linker(s). In an aspect, the metal-organic framework is MOF-274. In an aspect, the metal-organic framework is EMM-67. In an aspect, the metal-organic framework has an $N_2$ absorption between about 25 mmol/g and about 40 mmol/g at relative pressure between about 0.1 and about 0.9. In an aspect, the metal-organic framework produces powder x-ray diffraction peaks at 2θ values between about 4° and about 6° and between about 7° and about 9°. In an aspect, the metal-organic frameworks produce powder x-ray diffraction peaks at 2θ values which are about equal to metal-organic frameworks made by a traditional synthesis.

In an aspect, the metal-organic frameworks provide an X-ray diffraction pattern having a unit cell that can be indexed to a hexagonal unit cell. In an aspect, the unit cell is selected from spacegroups 168 to 194 as defined in the *International Tables for Crystallography*. In an aspect, the present metal-organic frameworks further comprise a metal rod structure composed of face-sharing octahedral, described by the Lidin-Andersson helix, as identified by Schoedel, Li, Li, O'Keeffe, and Yaghi, *Chem Rev.* 2016 116, 12466-12535. In an aspect, the metal-organic framework has a hexagonal pore oriented parallel to the metal rod structure. In an aspect, the present metal-organic frameworks display a (3,5,7)-c msi net, according to the approach described is by Schoedel, Li, Li, O'Keeffe, and Yaghi, *Chem Rev.* 2016 116, 12466-12535. In an aspect, The metal-organic framework displays a (3,5,7)-c msg net, according to the approach described by Schoedel, Li, Li, O'Keeffe, and Yaghi, *Chem Rev.* 2016 116, 12466-12535.

In an aspect, the subject metal-organic frameworks express the following peak maxima in an X-ray diffraction pattern at 30° C. The peaks were obtained after drying at 250° C. under $N_2$ for 30 minutes.

| d(Å) |
| --- |
| 18.65 ± 0.5 |
| 10.79 ± 0.5 |
| 9.35 ± 0.5 |
| 7.07 ± 0.5 |
| 6.51 ± 0.5 |
| 6.24 ± 0.5 |
| 5.84 ± 0.5 |
| 5.41 ± 0.5 |
| 5.19 ± 0.5 |

In another aspect, the subject metal-organic frameworks express the following peak maxima in an X-ray diffraction pattern at 30° C. The following peaks were obtained after drying at 250° C. under $N_2$ for 30 minutes.

| d(Å) |
| --- |
| 18.65 ± 0.5 |
| 10.79 ± 0.5 |
| 7.07 ± 0.5 |
| 5.41 ± 0.5 |
| 5.19 ± 0.5 |

In an aspect, an A axis of the unit cell and a B axis of the unit cell are each greater than 18 Å, and a c axis is greater than 6 Å.

Optionally, the metal-organic framework compositions can include one or more impurities, such as unreacted metal compounds or ligand that become incorporated into the solid product. Such impurity compounds can include, but are not limited to, metal compound(s) used as a reagent for forming a metal-organic framework; salts formed from a) the metal ion used for introducing a base into the synthesis mixture and b) the counter-ions from the metal compounds; and/or unreacted linker(s). Examples of metal compounds can include carbonates (such as $MgCO_3$), oxides (such as MgO), hydroxides (such as $Mg(OH)_2$), nitrates (such as $Mg(NO_3)_2$), and chlorides (such as $MnCl_2$). An example of a salt formed in the synthesis mixture can be $NaNO_3$, where the Na is initially introduced as part of a base (such as NaOH) and the $NO_3$ is introduced as the counter-ion in a metal compound (such as $Mg(NO_3)_2$).

Metal-Organic Framework

In various aspects, methods are provided for forming metal-organic framework is compositions from an aqueous synthesis mixture or a synthesis mixture including a substantial portion of water. The metal-organic framework can include a single metallic element, or the metal-organic framework can correspond to a mixed-metal-organic framework that includes a plurality of distinct metallic elements. The metallic element(s) in the metal-organic framework can be bridged by a plurality of organic linkers, where each linker is connected to at least one metal ion.

In an example where a single metallic element (such as a single divalent metal ion) is used, the metal-organic framework can be represented by the formula $M^1{}_2A$, wherein $M^1$ is a metal and A is an organic linker as described herein, such as one or more disalicylate linkers.

In another aspect, a mixed-metal-organic framework can have the general Formula I:

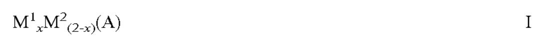

$$M^1{}_xM^2{}_{(2-x)}(A) \qquad I$$

wherein $M^1$ is a metal and $M^2$ is a metal, but $M^1$ is not $M^2$;

X is a value from 0 to 2, or 0.01 to 1.99; and

A is an organic linker as described herein, such as one or more disalicylate linkers.

In general, X can have any value between 0 and 2. It is note that both X=0 and X=2 result in a metal-organic framework that includes only a single metal. In an aspect, X is a value from 0.01 to 1.99. In an aspect, X is a value from 0.1 to 1. In an aspect, X is a value selected from the group consisting of 0.05, 0.1, 0.5 and 1. Further, while X and 2-X represent the relative ratio of $M^1$ to $M^2$, it should be understood that any particular stoichiometry is not implied in Formula I, Formula IA, Formula II or Formula III described herein. As such, the mixed-metal-organic frameworks of the Formula I, IA, II or III are not limited to a particular relative ratio of $M^1$ to $M^2$. It is further understood that the metals are typically provided in ionic form and available valency will vary depending on the metal selected.

The metal of a metal-organic framework as described herein (including a metal-organic framework according to Formula I, IA, II, or III) can be one of the elements of Period 4 Groups IIA, IIIB, IVB, VB, VIB, VIIB, VIII, IB and IIB of the Periodic Table and Period 3 Group IIA is including Mg, Ca, V, Mn, Cr, Fe, Co, Ni, Cu and Zn. Furthermore, in aspects where a plurality of metals are present, the mixed-metal-organic framework can include two or more distinct elements as well as different combination of metals, theoretically represented as $M^1{}_xM^2{}_y \ldots M''{}_z(A)(B)_2 | x+y+ \ldots + z=2$ and $M^1 \neq M^2 \neq \ldots \neq M''$.

In some aspects where only a single metal is present, the metal can be selected from Mg, V, Ca, Mn, Cr, Fe, Co, Ni, Cu and Zn. In some aspects where a plurality of metals are present, such as according to Formula I, $M^1$ can selected from Mg, V, Ca, Mn, Cr, Fe, Co, Ni, Cu and Zn; and $M^2$ can be selected from Mg, V, Ca, Mn, Cr, Fe, Co, Ni, Cu and Zn, provided that $M^1$ is not $M^2$. In another aspect, $M^1$ is selected from the group consisting of Mg, Mn, Ni and Zn; and $M^2$ is selected from the group consisting of Mg, Mn, Ni and Zn; provided $M^1$ is not $M^2$. In yet another aspect, $M^1$ is Mg and $M^2$ is Mn. In still another aspect, $M^1$ is Mg and $M^2$ is Ni. In yet another aspect, $M^1$ is Zn and $M^2$ is Ni. It is further understood that the metals are typically provided in an ionic form and the valency will vary depending on the metal selected. Further, the metals can be provided as a salt or in salt form.

Additionally or alternately, in aspects where the metal-organic framework corresponds to a mixed-metal-organic framework, at least one metal can be a monovalent metal that would make A the protonated form of the linker H-A. For example, the metal can be $Na^+$ or one from Group I. Also, the metal can be one of two or more divalent cations ("divalent metals") or trivalent cations ("trivalent metals"). In an aspect, the mixed metal mixed organic framework includes metals which are at oxidation states other than +2 can (i.e., more than just divalent, trivalent tetravalent, . . . ). The framework can have metals comprising a mixture of different oxidation states. Exemplary mixtures include Fe(II) and Fe(III), Cu(II) and Cu(I) and/or Mn(II) and Mn(III). More specifically, trivalent metals are metals having a +3 oxidation state. Some metals used to form the mixed-metal-organic framework, specifically Fe and Mn, can adopt +2 (divalent) or +3 (trivalent) oxidation states under relatively gentle conditions. Chem. Mater, 2017, 29, 6181. Likewise, Cu(II) can form Cu(I) under gentle conditions. As such, any minor change to the oxidation state of any of the metals and/or selective change in the oxidation state of a metal can be used to modify the present mixed-metal-organic frameworks. Furthermore, any combination of different molecular fragments $C_1$, $C_2$, . . . $C_n$ may exist. Finally, all of the above variations can be combined, for example, multiple metals (two or more distinct metals) with multiple valences and multiple charge-balancing molecular fragments.

Suitable organic linkers (also referred to herein as "linkers") can be determined from is the structure of the mixed-metal-organic framework and the symmetry operations that relate the portions of the organic linker that bind to the metal node of the mixed-metal-organic framework. A ligand which is chemically or structurally different, yet allows the metal node-binding regions to be related by a $C_2$ axis of symmetry, will form a mixed-metal-organic framework of an identical topology. In an aspect, the organic linker can be formed by two phenyl rings joined at carbon 1,1', with carboxylic acids on carbons 3, 3', and alcohols on carbons 4,4'. Switching the position of the carboxylic acids and the alcohols (e.g., "pc-$H_4$DOBPDC" described below) still allows for formation of a mixed-metal-organic framework.

Generally, the linker can correspond to a disalicylate. A disalicylate corresponds to a linker that includes two mono-hydroxybenzoate groups.

In an aspect, useful linkers include:

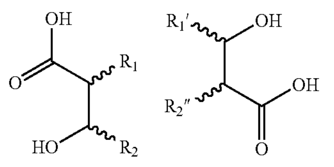

where $R_1$ is connected to $R_1$' and $R_2$ is connected to $R_2$."

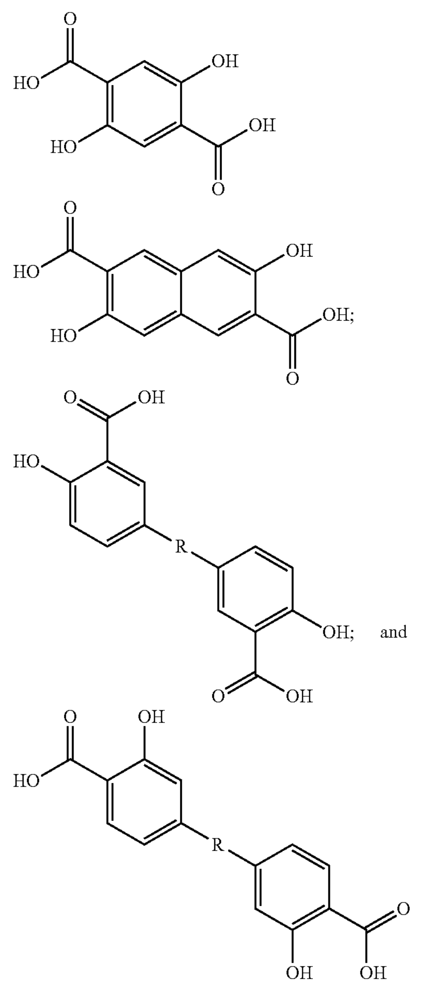

and

Examples of such linkers include:

where R is any molecular fragment.

Examples of suitable organic linkers include para-carboxylate ("pc-linker") such as 4,4'-dioxidobiphenyl-3,3'-dicarboxylate (DOBPDC); 4,4"-dioxido-[1,1':4',1"-terphenyl]-3,3"-dicarboxylate (DOTPDC); and dioxidobiphenyl-4,4'-dicarboxylate (para-carboxylate-DOBPDC also referred to as PC-DOBPDC) as well as the following compounds:

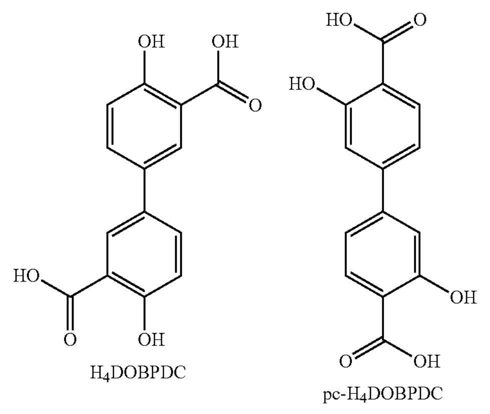

$H_4$DOBPDC pc-$H_4$DOBPDC

-continued

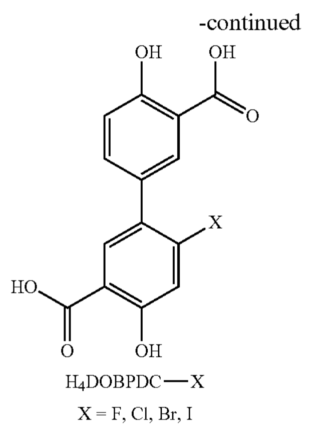

$H_4DOBPDC—X$

X = F, Cl, Br, I

In an aspect, the organic linker has the formula:

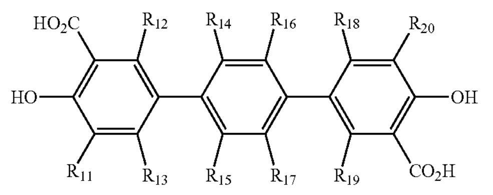

where $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl.

In an aspect, the organic linker has the formula:

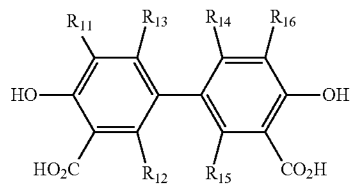

where, $R_{11}$, $R_{12}$, $R_{13}$, $R_{14}$, $R_{15}$, and $R_{16}$ are each independently selected from H, halogen, hydroxyl, methyl, and halogen substituted methyl.

In an aspect, the organic linker has the formula:

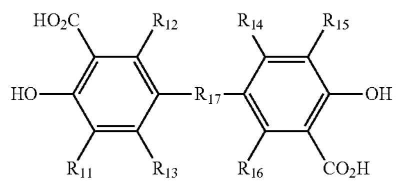

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

In an aspect, the organic linker has the formula:

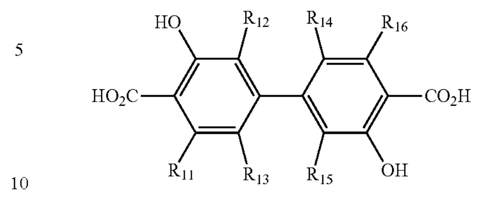

where $R_{11}$, $R_{12}$, $R_{13}$, $R_{14}$, $R_{15}$, and $R_{16}$ are each independently selected from H, halogen, hydroxyl, methyl, or halogen substituted methyl.

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or is unsubstituted aryl, vinyl, alkynyl, and substituted or unsubstituted heteroaryl.

In an aspect, the organic linker includes multiple bridged aryl species such as molecules having two (or more) phenyl rings or two phenyl rings joined by a vinyl or alkynyl group.

In an aspect, a mixed-metal-organic framework can correspond to structural Formula IA:

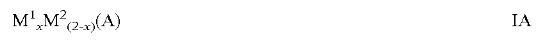

$$M^1_xM^2_{(2-x)}(A) \qquad IA$$

wherein $M^1$ is a metal independently selected from Mg, Ca, V, Mn, Cr, Fe, Co, Ni, Cu or Zn, or salt thereof;

$M^2$ is a metal independently selected from Mg, Ca, V, Mn, Cr, Fe, Co, Ni, Cu or Zn or salt thereof, but $M^1$ is not $M^2$;

X is a value from 0.01 to 1.99; and

A is an organic linker as described herein.

As described herein, the mixed-metal mixed-organic frameworks are porous crystalline materials formed of two or more distinct metal cations, clusters, or chains joined by two or more multitopic (polytopic) organic linkers.

Variations on MOF Structures

MOF-274 is an example of a type of MOF that can be synthesized using disalicylate linkers. The traditional MOF-274 structure corresponds to $M_2$(dobpdc) where M=various 2+ metal ions. Many variations of MOF-274 can be formed that also correspond to metal-organic framework materials. Examples of these variations are described here for MOF-274, but it is understood that this is to illustrate the nature of the variations. Thus, similar variations on other types of metal-organic framework materials that also include disalicylate linkers are also is contemplated herein.

In some aspects, one type of variation corresponds to $M_xN_{2-x}$(dobpdc), where M and N are different 2+ metal ions. This represents a variation where two different types of divalent metal ions are included in the metal-organic framework material. Another variation can be to have more than two different types of divalent metal ions. Still another variation can be to have a plurality of metal ions, with some metal ions having an oxidation state different from 2+. Yet another variation corresponds to $M_{x-y}N_{2-x-z}(dobpdc)_{1-y}$ where M and N are the same or different 2+ metal ions, z and y are <2, and the structure contains defects in the form of missing metals.

In some aspects, a type of variation corresponds to $M_xN_{2-x}(dobpdc)_{1-y}$, where M and N are the same or different 2+ metal ions and the structure contains defects in the form of missing linkers. Another type of variation corresponds to $M_xN_{2-x}(dobpdc)_{1-y}A$ where M and N are the same or different 2+ metal ions and the structure contains defects in the form of missing linkers and A is a charge balancing anion (e.g. $Cl^-$, $F^-$, $Br^-$, $OH^-$, $NO_3^-$). Yet another type of variation corresponds to $M_{x-y}N_{2-x-y}$(dobpdc)Z, where M and N are the same or different 2+ metal ions and the structure contains defects in the form of missing linkers and Z is a charge balancing cation (e.g. $H^+$, $Na^+$, $K^+$).

In some aspects, a type of variation corresponds to $M_xN_{2-x}$(dobpdc)$Sol_{0.1-2}$ where M and N are the same or different 2+ metal ions and the structure contains defects in the form of missing linkers and Sol is a coordinating monodentate ligand (such as $OH_2$, MeOH, DMF, MeCN, THF, $NR_3$, $HNR_2$, $H_2NR$). Another type of variation corresponds to $M_xN_{2-x}$(dobpdc)$Sol_{0.05-1}$ where M and N are the same or different 2+ metal ions and the structure contains defects in the form of missing linkers and Sol is a coordinating bidentate ligand.

Carbon Dioxide Applications

In some aspects, a mixed-metal-organic framework that contains more than one metal species of ions (a "cluster") can be later functionalized (or appended) with a diamine ligand (a "ligand") to provide a mixed-metal mixed-organic framework system. Such a mixed-metal mixed-organic framework system can be useful as adsorbent or adsorbent material of $CO_2$ in various applications and emission streams. The mixed-metal-organic framework can be prepared from multiple metal sources and is appended by one or more organic ligand such as an amine to provide the mixed-metal mixed-organic framework system. In various aspects, the mixed-metal mixed-organic framework system can display a Type-V isotherm.

For example, in an aspect, an EMM-67 mixed-metal-organic framework can be later functionalized with the amine 2-(aminomethyl)-piperidine (2-ampd) to provide the mixed-metal is mixed-organic framework system EMM-44. This mixed-metal mixed-organic framework system can reversibly and selectively bind to $CO_2$ and can be regenerated for repeat use by mild heating or by exposing to vacuum. The required percentage of $CO_2$ to be adsorbed in a gas stream and the required temperature for binding can be adjusted by varying the ratio of the two metal ions in the mixed-metal-organic framework, allowing for broad distribution and implementation in $CO_2$ capture from diverse emission streams.

More generally, a ligand appended to a metal-organic framework structure can correspond to a ligand containing one or more groups capable of functioning as suitable Lewis base (electron donor) such as oxygen, phosphorus or sulfur or an amine having 1 to 10 amine groups. Ligands suitable for use in the mixed-metal mixed-organic framework systems can have (at least) two functional groups: 1) A functional group used to bind $CO_2$ and 2) a functional group used to bind the metal. The second functional group that binds the metal can also be an amine. It is possible to use other functional groups such as oxygen containing groups like alcohols, ethers or alkoxides, carbon groups like carbenes or unsaturated bonds like alkenes or alkynes, or sulfur atoms.

One benefit of adsorbents based on an MOF-274/EMM-67/EMM-44 type structure is that additional control over adsorption profiles can be achieved in various ways. For example, by varying the ratio of metals incorporated in the mixed-metal-organic framework, a position of the step in the isotherm can be varied as a function of $CO_2$ partial pressure. This feature can be used to develop additional types of adsorbent systems. As an example, in an aspect, a series of several mixed-metal-organic frameworks, each comprising both Mg and Mn ions, can be functionalized with amine 2-ampd to provide a series of mixed-metal mixed-organic framework systems. When exposed to $CO_2$, the material with the least amount of Mn and greatest amount of Mg displays a Type-V isotherm at the lowest pressure of $CO_2$. The material with the most Mn and least amount of Mg displays a Type-V isotherm at the highest pressure of $CO_2$. A direct relationship is observed between the ratio of Mn to Mg contained in the mixed-metal mixed organic framework system and the pressure of $CO_2$ where the Type-V isotherm is observed.

Methods of use for adsorption materials based on EMM-44 include a variety of gas separation and manipulation applications including the isolation of individual gases from a stream of combined gases, such as carbon dioxide/nitrogen, carbon dioxide/hydrogen, carbon dioxide/methane, carbon dioxide/oxygen, carbon monoxide/nitrogen, carbon monoxide/methane, carbon monoxide/hydrogen, hydrogen sulfide/methane and hydrogen sulfide/nitrogen.

Among the primary benefits of physisorption onto solid materials is the low regeneration energy compared to that required for aqueous amines. However, this benefit is frequently comes at the expense of low capacity and poor selectivity. The present systems provide adsorbents (adsorbent materials) that can bridge the two approaches through the incorporation of sites that bind $CO_2$ by chemisorption onto solid materials. These adsorption materials may eliminate the need for aqueous solvents, and may have significantly lower regeneration costs compared with traditional amine scrubbers, yet maintain their exceptional selectivity and high capacity for $CO_2$ at low pressures.

In an aspect, the EMM-44 mixed-metal mixed-organic framework system can separate gases at low temperatures and pressures. For example, EMM-44 can be useful for pre-combustion separation of carbon dioxide and hydrogen and methane from a stream of gases and for separation of carbon dioxide from a stream of post-combustion flue gases at low pressures and concentrations. More generally, EMM-44 can be adapted to many different separation needs.

As further examples, there are a number of technical applications for materials capable of adsorption of $CO_2$. One such application is carbon capture from coal flue gas or natural gas flue gas. The increasing atmospheric levels of carbon dioxide ($CO_2$), which are contributing to global climate change, warrant new strategies for reducing $CO_2$ emissions from point sources such as power plants. In particular, coal-fueled power plants are responsible for 30-40% of global $CO_2$ emissions. See, Quadrelli et al., 2007, "The energy-climate challenge: Recent trends in $CO_2$ emissions from fuel combustion," Energy Policy 35, pp. 5938-5952, which is hereby incorporated by reference. Thus, there remains a continuing need for the development of new adsorbents for carbon capture from coal flue gas, a gas stream consisting of $CO_2$ (15-16%), $O_2$ (3-4%), $H_2O$ (5-7%), $N_2$ (70-75%), and trace impurities (e.g. $SO_2$, $NO_x$) at ambient pressure and 40° C. See, Planas et al., 2013, "The Mechanism of Carbon Dioxide Adsorption in an Alkylamine-Functionalized Metal-organic Framework," J. Am. Chem. Soc. 135, pp. 7402-7405, which is hereby incorporated by reference. Similarly, growing use of natural gas as a fuel source necessitates the need for adsorbents capable of $CO_2$ capture from the flue gas of natural gas-fired power plants. Flue gas produced from the combustion of natural gas contains lower $CO_2$ concentrations of approximately 4-10% $CO_2$, with the remainder of the stream consisting of $H_2O$ (saturated), $O_2$ (4-12%), and $N_2$ (balance). In particular, for a temperature swing adsorption process an adsorbent should possess the following properties: (a) a high working capacity with a minimal temperature swing, in order to minimize regeneration energy costs; (b) high selectivity for $CO_2$ over the other constituents of coal flue gas; (c) 90% capture of $CO_2$ under flue gas conditions; (d) effective performance under humid conditions; and (d) long-term stability to adsorption/desorption cycling under humid conditions.

Another potential application for EMM-44 is carbon capture from crude biogas. Biogas, the $CO_2/CH_4$ mixtures produced by the breakdown of organic matter, is a renewable fuel source with the potential to replace traditional fossil fuel sources. Removal of $CO_2$ from the crude biogas mixtures is one of the most challenging aspects of upgrading this promising fuel source to pipeline quality methane. Therefore, the use of adsorbents to selectively remove $CO_2$ from $CO_2/CH_4$ mixtures with a high working capacity and minimal regeneration energy has the potential to greatly reduce the cost of using biogas in place of natural gas for applications in the energy sector.

The EMM-44 adsorption materials described herein can be used to strip a major portion of the $CO_2$ from the $CO_2$-rich gas stream, and the adsorption material enriched for $CO_2$ can be stripped of $CO_2$ using a temperature swing adsorption method, a pressure swing adsorption method, a vacuum swing adsorption method, a concentration swing adsorption method, or a combination thereof. Example temperature swing adsorption methods and vacuum swing adsorption methods are disclosed in International Publication Number WO2013/059527 A1.

Isosteric heat of adsorption calculations provide an indicator of the strength of the interaction between an adsorbate and adsorbent, specifically determined from analysis of adsorption isotherms performed across a series of different temperatures. *J. Phys. Chem. B,* 1999, 103, 6539-6545; *Langmuir,* 2013, 29, 10416-10422. Differential scanning calorimetry is a technique which measures the amount of energy released or absorbed as a parameter (such as temperature or $CO_2$ pressure) varies.

Comparative Example 1—Traditional Synthesis Methods for MOF-274

An example of a synthesis method can be taken from *J. Am. Chem. Soc,* 2017, 139, 10526-10538. In short, 9.89 g (36.1 mmol) linker $H_4$DOBPDC is combined with 11.5 g (44.9 mmol) of $Mg(NO_3)_2\cdot 6H_2O$ and dissolved in 200 mL of 55:45 (v/v) methanol:N,N-dimethylformamide (DMF) solution via sonication. Thus, the combined concentration of metals plus linkers in this reaction mixture corresponds to 0.45 moles per liter of solvent. Reaction mixture is then placed in 350 mL glass pressure vessel, sealed, and heated to 120 C for 20 hrs, and the solids were collected and washed with DMF and methanol after the heat treatment. This Example of MOF-274 can be referred to herein as Reference Material A.

Example 2—High Solids Synthesis of EMM-67

In order to prepare EMM-6,7 22.34 mmol of $H_4$DOBPDC ligand was dispersed in 15 mL of water and mixed well for several minutes. Separately, 47 mmol of MgO and 2.48 mmol of MnO were dispersed in 15 mL of water. The metal-containing solution was then slowly added to the ligand solution to form the synthesis mixture. The synthesis mixture was mixed until it appeared homogeneous. The synthesis mixture was then transferred to a microwave suitable container. The synthesis mixture was microwaved until the synthesis gel thickened to at least a paste like/powder consistency. The resulting product was then removed from the microwave and washed by filtration first with water and then with ethanol.

Example 3—High Solids Synthesis of EMM-67

In order to prepare EMM-67, 12 mmol of $H_4$DOBPDC was dispersed in 15 mL of water and combined in a Teflon™ liner. Then, 22.856 mmol of MgO and 1.143 mmol of MnO were added to the ligand and water. The resulting synthesis gel was well mixed. The synthesis gel in the Teflon liner was sealed on a high throughput synthesis tool and heated to 120° C. for 16 hrs. The resulting product mixture was then cooled to room temperature. The product mixture was washed several times with water and then ethanol. The product was then collected by centrifugation.

Example 4—Characterization of EMM-67 Samples

The materials prepared in Example 2 and Example 3 were characterized using powder X-ray diffraction (PXRD), scanning electron microscopy (SEM), and $N_2$ physisorption.

Figure 2:
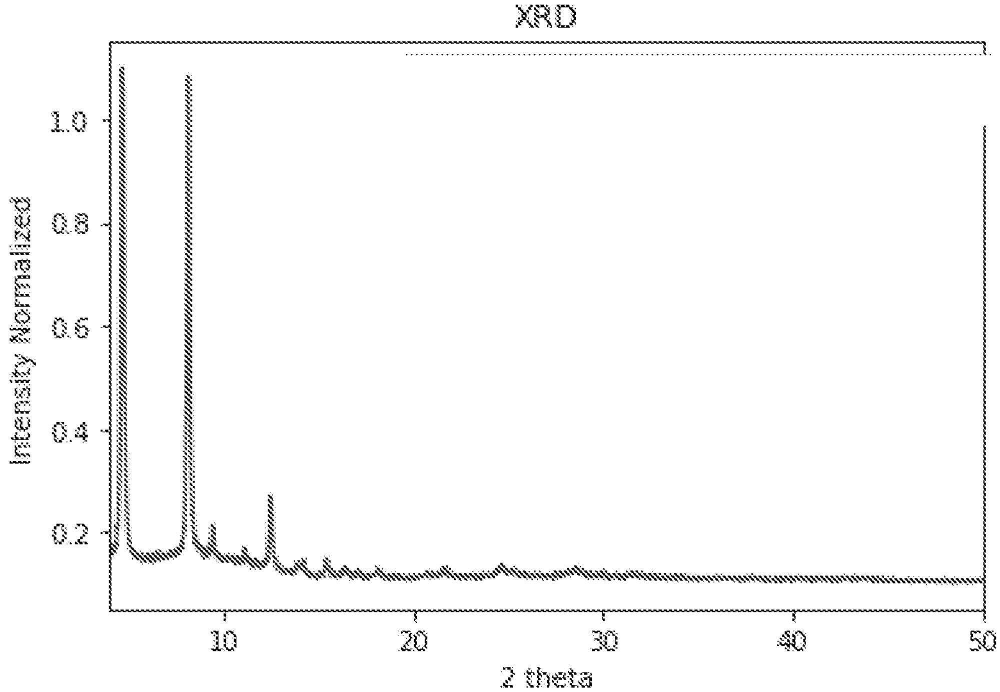
FIG. 2 shows powder x-ray diffraction data of a sample of EMM-67 prepared from another synthesis mixture including a high solids content of metal oxides.

FIG. 1 shows the powder X-ray diffraction pattern for the material from Example 2. FIG. 2 shows the powder X-ray diffraction pattern for the material from Example 3. The PXRD patterns in Example 2 and Example 3 show that the high solids synthesis mixture resulted in formation of EMM-67. The EMM-67 characteristic peaks are consistently present without any impurities visible in the x-ray diffraction pattern. It is noted that in other examples, however, peaks associated with impurities can be present. Example 11 below notes some potential impurity peaks that can be present.

Figure 3:
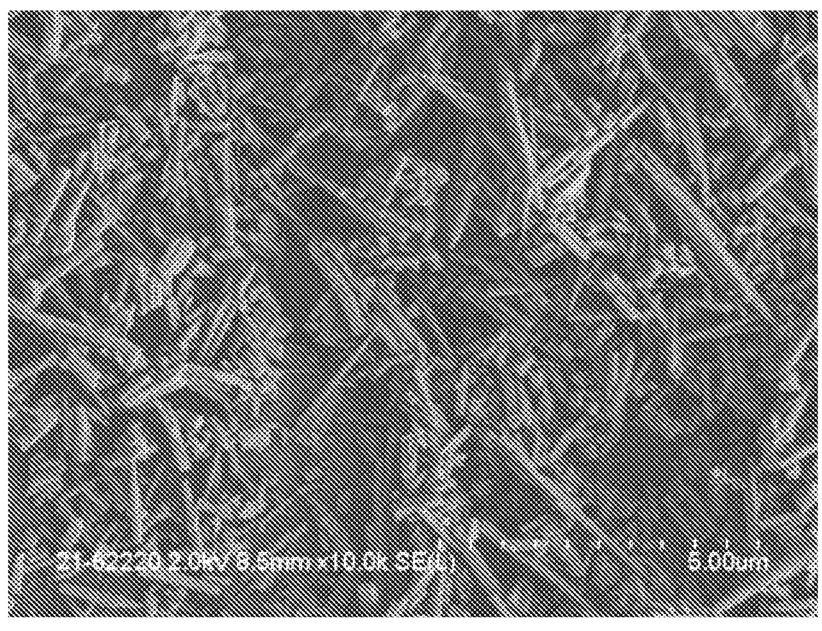
FIG. 3 shows SEM images for EMM-67 prepared from a synthesis mixture including a high solids content of metal oxides.
Figure 3:
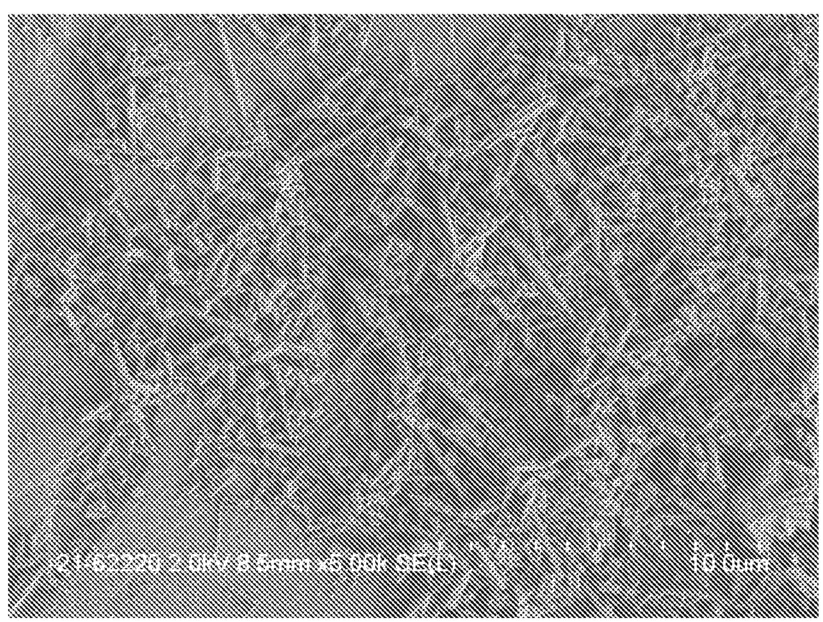
Figure 4:
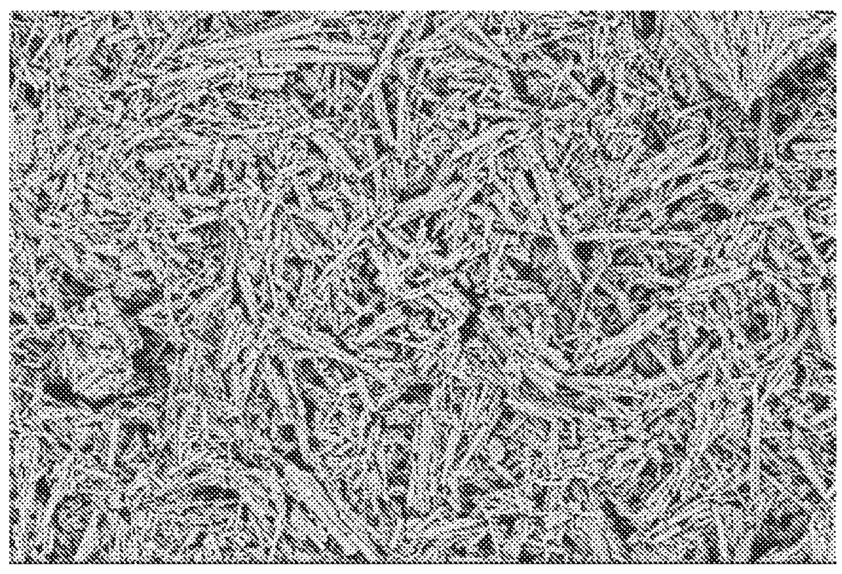
FIG. 4 shows SEM images for EMM-67 prepared from another synthesis mixture including a high solids content of metal oxides.
Figure 4:
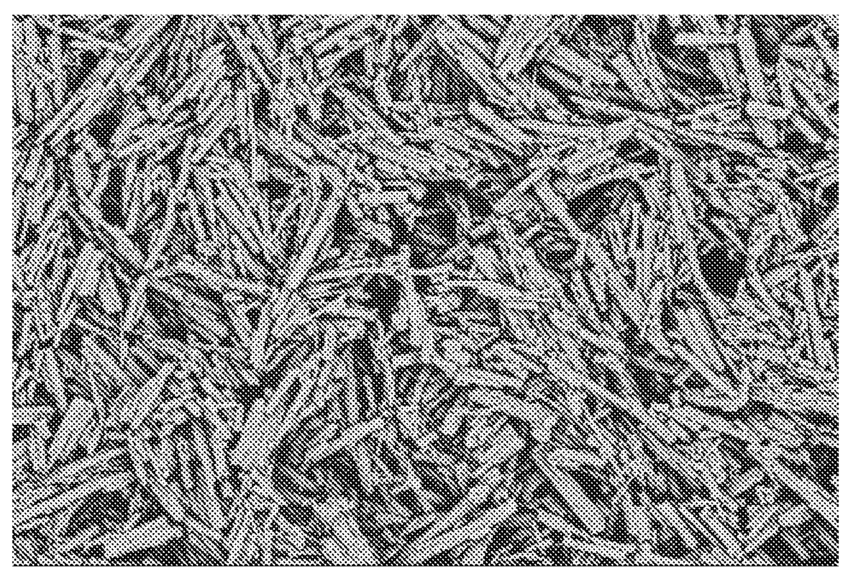

FIG. 3 shows representative SEM images of the material made according to Example 2. FIG. 4 shows SEM images of the material made according to Example 3. As shown in FIG. 3 and FIG. 4, the crystalline materials made according to Example 2 and Example 3 have a rod-like morphology that is typical for EMM-67. As explained further in Example 10, the aspect ratio of the crystalline materials made according to Example 2 and Example 3 is smaller than the aspect ratio of crystals made using a conventional synthesis. The SEM images were collected on a Hitachi SEM at 2 keV acceleration using the upper detector.

Figure 5:
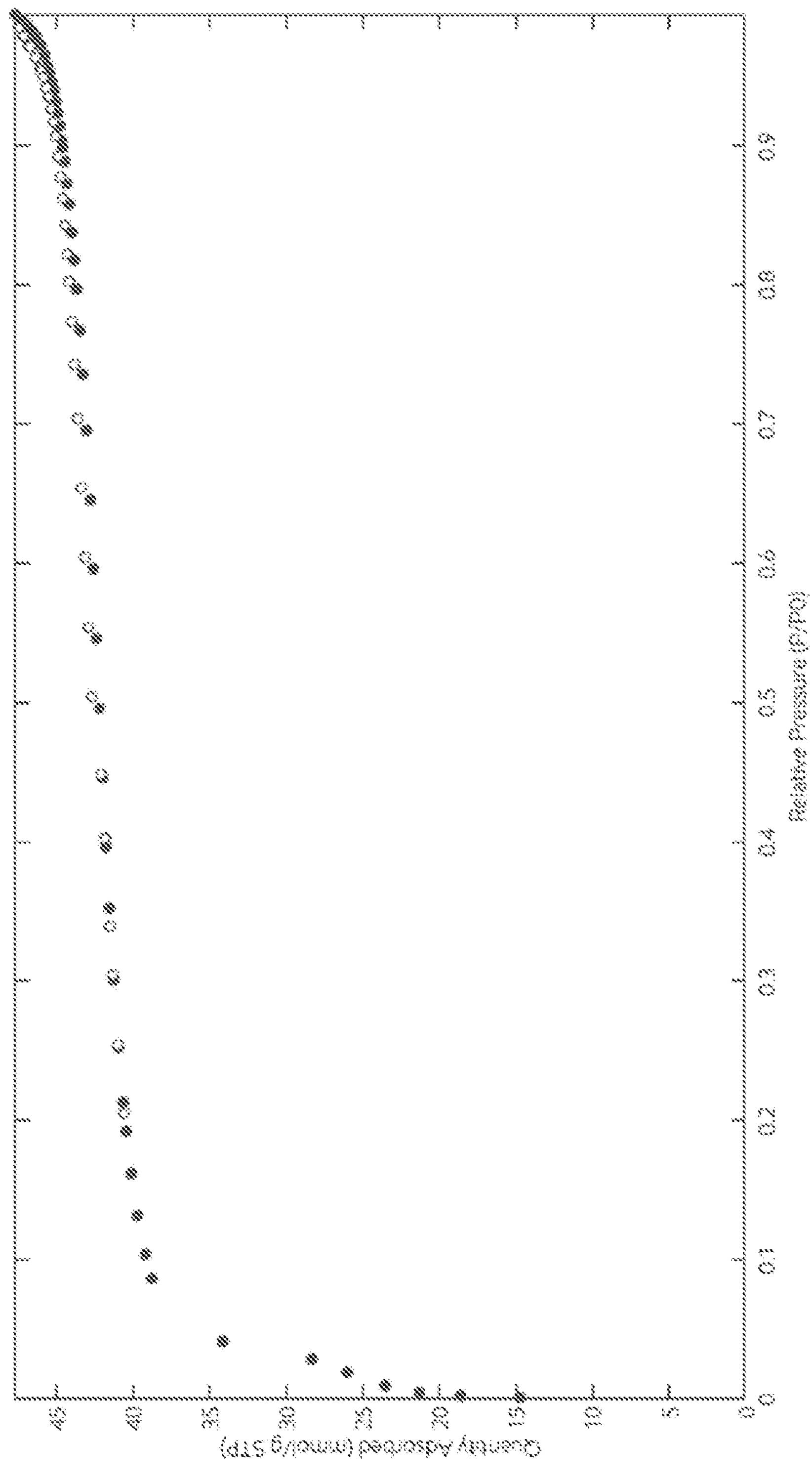
FIG. 5 shows nitrogen physisorption data for EMM-67 prepared from a synthesis mixture including a high solids content of metal oxides.

FIG. 5 shows an $N_2$ physisorption plot for the material made according to Example 3.

Example 5—Additional High Solids Synthesis Mixtures Including Metal Oxides

MOF-274 was synthesized by forming various synthesis mixtures in an IKA tube mill and then mixing the synthesis mixtures. This example and Example 3 illustrate that a variety of mixing methods can be used to form MOF-274 from high solids and/or high kinematic viscosity synthesis mixtures.

In a first synthesis, $H_4$DOBPDC linker (0.82 g) and MgO (0.30 g) were added to a plastic IKA tube mill container. 1.00 mL of water was then added prior to any mixing to make a 53 wt % solids mixture. The synthesis mixture was then blended with a 17,000 rpm blade rotor for 30 minutes. The resulting powder was washed in 40 mL MeOH to obtain the final MOF material.

In another synthesis, $H_4$DOBPDC linker (0.82 g) and MgO (0.30 g) were added to a plastic IKA tube mill container to form a 100 wt % solids synthesis mixture. No water was added to the mixture. The synthesis mixture was blended with a 17,000 rpm blade rotor for 30 minutes. The resulting powder was washed in 40 mL MeOH to obtain the final MOF material.

PXRD patterns of the MOF materials formed from the synthesis mixture containing 53 wt % solids and the synthesis mixture containing 100 wt % solids were obtained. Although the PXRD patterns showed that the resulting products contain ligand impurities, the patterns also showed that MOF-274 was formed. Without being bound by any particular theory, it is believed that the unreacted ligand in the reaction products was present due to the relatively low reaction temperature (~20° C.) and therefore slow crystallization kinetics of MOF-274. It is believed that with higher reaction temperatures during mixing, reaction kinetics would favor formation of the MOF and complete utilization of the linker starting reagent. Likewise, it is believed that an increase in reaction time at room temperature would increase yield of the MOF.

Without being bound by any particular theory, it is further noted that water appears to facilitate the reaction of MgO and linker. It is believed that water facilitates the reaction due to dissolution of the metal and linker salts. However, water is not required for formation of MOF-274.

Example 6—Crystal Aspect Ratio from High Solids Synthesis

Although formation of MOF materials from high solids synthesis provides the same or similar crystalline structures, the size and/or shape of the resulting crystals is different from the crystals formed in a conventional synthesis. In particular, the MOF crystals formed from a high solids synthesis mixture have a smaller aspect ratio (length versus width/diameter) than the aspect ratio for crystals formed from a conventional synthesis method.

MOF crystals formed from synthesis mixtures using a disalicylate linker typically have a rod-like morphology. The individual rod-like crystals can aggregate into groups, but the individual crystals can be readily identified using an imaging method such as scanning electron microscopy (SEM). In a conventional synthesis (30 wt % or less of solids in the synthesis mixture), the resulting crystals have an average aspect ratio (length versus width/diameter) of 9.0 to 1 or higher, or 10 to 1 or higher. By contrast, MOF crystals formed as described herein using a high solids synthesis mixture (35 wt % or more of solids) have an average aspect ratio of 4.5 to 8.0, or 4.5 to 7.0, or 5.5 to 8.0, or 5.5 to 7.0, or 6.0 to 8.0. Average aspect ratio can be determined based on SEM images. A sample of an SEM image containing 50 or more crystals can be identified, and the aspect ratio for each crystals of the 50 or more crystals can be determined. The average aspect ratio for the 50 or more crystals can then be determined by dividing by the number of crystals.

The difference in average aspect ratio is due in part to a difference in the average length of the crystals. For a high solids synthesis mixture (35 wt % or more solids), the length of the resulting crystals is roughly 0.3 to 0.8 Angstroms on average. By contrast, for a conventional synthesis mixture (30 wt % or less solids), the length of the resulting crystals is roughly 1.0 to 2.5 Angstroms on average.

Example 7—Additional Impurity Peaks

Depending on the nature of the synthesis mixture, the reaction conditions (including temperature and mixing rate), and the reaction time, the MOF compositions formed by the methods described herein can be used to form either pure phase MOF crystals or to form a product that includes some amount of impurities. One type of impurity that can be visible in a PXRD pattern is an impurity due to incomplete reaction of a reagent, such as incomplete reaction of a metal compound. Another type of impurity can correspond to a salt that is formed from a) a metal introduced as part of a separate base in the synthesis mixture and b) the counter-ion of a metal compound in the synthesis mixture. Depending on the aspect, such impurities can correspond to 20 wt % or less of the product formed from a synthesis mixture, or 10 wt % or less, or 5.0 wt % or less, such as down to having substantially no impurities.

The following tables show examples of potential peak locations for impurities that may be associated with formation of metal-organic framework structure compositions, such as MOF-274 (including EMM-67). Tables 1-3 provide potential peak locations based on impurities corresponding to $MgCO_3$ (Table 1), MgO (Table 2), and $Mg(OH)_2$ (Table 3).

TABLE 1

| $MgCO_3$ | |
|---|---|
| Peak Location (2Θ) | STD Range (2Θ) |
| 32.631 | +/−0.3 |
| 35.847 | +/−0.3 |
| 38.818 | +/−0.3 |
| 42.995 | +/−0.3 |
| 46.815 | +/−0.3 |
| 51.627 | +/−0.3 |
| 53.887 | +/−0.3 |
| 61.345 | +/−0.3 |
| 62.352 | +/−0.3 |
| 66.441 | +/−0.3 |
| 68.368 | +/−0.3 |
| 69.348 | +/−0.3 |
| 70.298 | +/−0.3 |
| 75.94 | +/−0.3 |
| 76.911 | +/−0.3 |
| 79.694 | +/−0.3 |
| 81.522 | +/−0.3 |
| 83.368 | +/−0.3 |
| 85.978 | +/−0.3 |
| 88.785 | +/−0.3 |
| 92.439 | +/−0.3 |
| 94.263 | +/−0.3 |
| 98.802 | +/−0.3 |
| 105.268 | +/−0.3 |
| 107.154 | +/−0.3 |
| 109.115 | +/−0.3 |
| 113.937 | +/−0.3 |
| 114.986 | +/−0.3 |
| 118.978 | +/−0.3 |
| 121.307 | +/−0.3 |
| 123.172 | +/−0.3 |
| 126.503 | +/−0.3 |
| 131.153 | +/−0.3 |
| 134.723 | +/−0.3 |
| 137.496 | +/−0.3 |
| 149.663 | +/−0.3 |

TABLE 2

| MgO | |
|---|---|
| Peak Location (2Θ) | STD Range (2Θ) |
| 36.937 | +/−0.3 |
| 42.917 | +/−0.3 |
| 62.303 | +/−0.3 |
| 74.691 | +/−0.3 |
| 78.63 | +/−0.3 |
| 94.051 | +/−0.3 |

TABLE 2-continued

| MgO | |
|---|---|
| Peak Location (2Θ) | STD Range (2Θ) |
| 105.733 | +/−0.3 |
| 109.764 | +/−0.3 |
| 127.284 | +/−0.3 |
| 143.752 | +/−0.3 |

TABLE 3

| $Mg(OH)_2$ | |
|---|---|
| Peak Location (2Θ) | STD Range (2Θ) |
| 18.785 | +/−0.3 |
| 31.138 | +/−0.3 |
| 36.65 | +/−0.3 |
| 38.1 | +/−0.3 |
| 49.903 | +/−0.3 |
| 55.368 | +/−0.3 |
| 58.971 | +/−0.3 |
| 64.982 | +/−0.3 |
| 67.749 | +/−0.3 |
| 68.198 | +/−0.3 |
| 69.231 | +/−0.3 |
| 77.774 | +/−0.3 |
| 81.338 | +/−0.3 |
| 84.741 | +/−0.3 |
| 89.411 | +/−0.3 |
| 90.462 | +/−0.3 |
| 92.992 | +/−0.3 |
| 102.602 | +/−0.3 |

Additional Embodiments

Embodiment 1. A method of making a metal-organic framework composition, comprising: forming a mixture comprising one or more metal compounds, a solvent, and at least one multi-ring disalicylate linker, the mixture comprising a solids content of 35 wt % or more, a kinematic viscosity at 40° C. of 500 cSt or more, or a combination thereof, and reacting the mixture for a reaction time to form a composition comprising a metal-organic framework, wherein the metal-organic framework comprises at least one metal of the one or more metal compounds and the at least one multi-ring disalicylate organic linker, and wherein i) at least a portion of the solvent is added to the mixture prior to mixing of the mixture; ii) the solvent is added to the mixture prior to addition of at least a portion of the one or more metal compounds; iii) the solvent is added to the mixture prior to addition of at least a portion of the at least one multi-ring disalicylate linker; or iv) a combination of two or more of i), ii), and iii).

Embodiment 2. The method of Embodiment 1, wherein the mixture comprises 10 wt % or more of one or more solvents, the mixture comprising a concentration of the at least one metal of 1.5 M or more based on a volume of the one or more solvents, a concentration of the at least one linker of 0.6 M or more, or a combination thereof.

Embodiment 3. The method of Embodiment 2, a) wherein the one or more solvents comprise 40 wt % or more of water; b) wherein the one or more solvents comprise one or more alcohols; c) wherein the one or more solvents comprise an organic solvent; or d) a combination of two or more of a), b), and c).

Embodiment 4. A method of making a metal-organic framework composition, comprising: forming a mixture comprising one or more metal compounds and at least one multi-ring disalicylate linker, the mixture being substantially free of solvent; and reacting the mixture for a reaction time to form a composition comprising a metal-organic framework, wherein the metal-organic framework comprises at least one metal of the one or more metal compounds and the at least one multi-ring disalicylate organic linker.

Embodiment 5. The method of any of the above embodiments, further comprising mixing the mixture prior to reacting the mixture, mixing the mixture during the reacting, or a combination thereof.

Embodiment 6. The method of any of the above embodiments, wherein the method further comprises heating the mixture during the reacting, a reaction temperature of the mixture during the reacting being between 50° C. and 160° C.

Embodiment 7. The method of any of the above embodiments, wherein the mixture comprises at least one base, a molar ratio of the at least one base to the at least one linker being between 3.0 to 5.0; or wherein the mixture comprises at least one buffer, a molar ratio of the at least one buffer to the at least one linker being between 5.0 and 15.

Embodiment 8. The method of any of the above embodiments, wherein the one or more metal compounds comprise one or more metal salts, or wherein the one or more metal compounds comprise at least one Mg-containing compound and at least one Mn-containing compound, or a combination thereof.

Embodiment 9. The method of any of the above embodiments, wherein a plurality of rings in the multi-ring disalicylate organic linker comprise a salicylate functional group; or wherein a plurality of rings in the multi-ring disalicylate organic linker are connected by at least one of a biphenyl linkage, a vinyl linkage, and an alkyl linkage; or wherein the linker is $H_4DOBPDC$; or a combination thereof.

Embodiment 10. A crystalline metal-organic framework composition comprising a multi-ring disalicylate linker and one or more metallic elements that form a crystalline structure comprising the metallic elements bridged by the multi-ring disalicylate linker, the crystalline metal-organic framework composition comprising crystals having an average aspect ratio of 8.0 to 1 or less, the composition optionally further comprising one or more amines appended to the crystalline metal-organic framework.

Embodiment 11. The crystalline metal-organic framework composition of Embodiment 10, wherein a plurality of rings in the multi-ring disalicylate organic linker comprise a salicylate functional group; or wherein a plurality of rings in the multi-ring disalicylate organic linker are connected by at least one of a biphenyl linkage, a vinyl linkage, and an alkyl linkage; or wherein the linker is $H_4DOBPDC$; or a combination thereof.

Embodiment 12. The crystalline metal-organic framework composition of Embodiment 10 or 11, wherein the metal-organic framework is of the formula: $M^1_2(A)$ where $M^1$ comprises a metal cation, and A comprises a multi-ring disalicylate organic linker, or wherein the metal-organic framework is of the formula: $M^1_xM_{2(2-x)}(A)$ where $M^1$ and $M^2$ comprise metal cations, x ranges from 0 to 2, and A comprises a multi-ring disalicylate organic linker.

Embodiment 13. The crystalline metal-organic framework composition of Embodiment 12, wherein $M^1$ and $M^2$ comprise different metallic elements, or wherein A comprises a plurality of multi-ring disalicylate organic linkers, or wherein at least one of $M^1$ and $M^2$ comprises a divalent metal ion, or a combination thereof.

Embodiment 14. The crystalline metal-organic framework composition of any of Embodiments 10 to 13, wherein the metal-organic framework comprises, as determined by nitrogen adsorption, A) a surface area of 700 $m^2/g$ or more, B) a micropore volume of 0.6 $cm^3/g$ to 1.6 $cm^3/g$, or C) a combination of A) and B).

Embodiment 15. The crystalline metal-organic framework composition of any of Embodiments 10 to 14, wherein the metal-organic framework comprises MOF-274, EMM-67, or a combination thereof.

Additional Embodiment A. The method or composition of any of the above embodiments, wherein the linker comprises a plurality of linkers selected independently from a group consisting of:

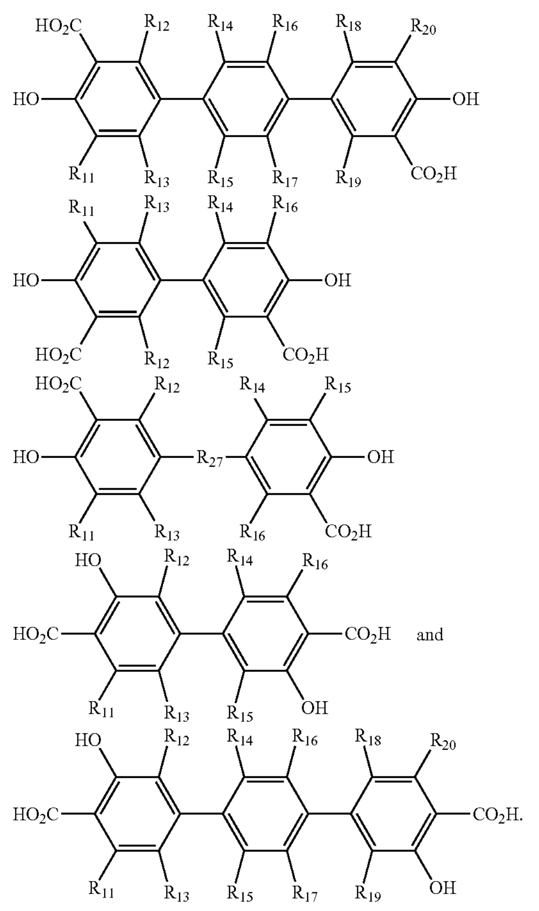

wherein $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl; and $R_{17}$ is selected from the group consisting of substituted or unsubstituted aryl, vinyl, alkynyl, substituted or unsubstituted heteroaryl, divinyl benzene, and diacetyl benzene.

Additional Embodiment B. The method or composition of any of the above embodiments, wherein the mixed metal-organic framework provides an X-ray diffraction pattern that can be indexed to a hexagonal unit cell, where the unit cell is selected from spacegroups 168 to 194; or wherein the metal-organic framework produces powder x-ray diffraction peaks at 2θ values between about 4° and about 6° and between about 7° and about 9°; or a combination thereof.

Additional Embodiment C. The method of any of Embodiments 1 to 9, wherein after the reacting, the composition comprises 20 wt % or less of one or more impurities.

Certain features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

The foregoing description of the disclosure illustrates and describes the present methodologies. Additionally, the disclosure shows and describes exemplary methods, but it is to be understood that various other combinations, modifications, and environments may be employed and the present methods are capable of changes or modifications within the scope of the concept as expressed herein, commensurate with the above teachings and/or the skill or knowledge of the relevant art.

We claim:

1. A method of making a metal-organic framework composition, comprising:

forming a mixture comprising one or more metal compounds, a solvent, and at least one multi-ring disalicylate linker, the mixture comprising a solids content of 35 wt % or more, a kinematic viscosity at 40° C. of 500 cSt or more, or a combination thereof; and reacting the mixture for a reaction time to form a composition comprising a metal-organic framework, wherein the metal-organic framework comprises at least one metal of the one or more metal compounds and the at least one multi-ring disalicylate organic linker, and i) wherein the method further comprises mixing the mixture, and wherein forming the mixture comprises adding the one or more metal compounds and the at least one multi-ring disalicylate linker to at least a portion of the solvent prior to mixing of the one or more metal compounds and the at least one multi-ring disalicylate linker;

ii) wherein forming of the mixture comprises adding the solvent prior to addition of at least a portion of the one or more metal compounds;

iii) wherein forming of the mixture comprises adding the solvent prior to addition of at least a portion of the at least one multi-ring disalicylate linker; or iv) a combination of two or more of i), ii), and iii).

2. The method of claim 1, further comprising mixing the mixture prior to reacting the mixture, mixing the mixture during the reacting, or a combination thereof.

3. The method of claim 1, wherein the method further comprises heating the mixture during the reacting, a reaction temperature of the mixture during the reacting being between 50° C. and 160° C.

4. The method of claim 1, wherein after the reacting, the composition comprises 20 wt % or less of one or more impurities.

5. The method of claim 1, wherein the mixture comprises 10 wt % or more of one or more solvents, the mixture comprising a concentration of the at least one metal of 1.5 M or more based on a volume of the one or more solvents and a concentration of the at least one linker of 0.6 M or more.

6. The method of claim 5, wherein the one or more solvents comprise 40 wt % or more of water relative to a weight of the one or more solvents, or wherein the one or more solvents comprise one or more alcohols, or a combination thereof.

7. The method of claim 5, wherein the one or more solvents comprise an organic solvent.

8. The method of claim 1, wherein the mixture further comprises at least one base, a molar ratio of the at least one base to the at least one linker being between 3.0 to 5.0.

9. The method of claim 1, wherein the mixture further comprises at least one buffer, a molar ratio of the at least one buffer to the at least one linker being between 5.0 and 15.

10. The method of claim 1, wherein the one or more metal compounds comprise one or more metal salts, or wherein the one or more metal compounds comprise at least one Mg-containing compound and at least one Mn-containing compound, or a combination thereof.

11. The method of claim 1, wherein a plurality of rings in the multi-ring disalicylate organic linker comprise a salicylate functional group; or wherein a plurality of rings in the multi-ring disalicylate organic linker are connected by at least one of a biphenyl linkage, a vinyl linkage, and an alkyl linkage; or wherein the linker is $H_4DOBPDC$; or a combination thereof.

12. The method of claim 1, wherein forming the mixture comprises adding the solvent prior to addition of at least a portion of the one or more metal compounds; or wherein forming the mixture comprises adding the solvent prior to addition of at least a portion of the at least one multi-ring disalicylate linker; or a combination thereof.

* * * * *